Sept. 9, 1952     W. B. MUELLER     2,609,616
GRADE INDICATOR FOR AUTOMOTIVE VEHICLES
Filed Jan. 4, 1952
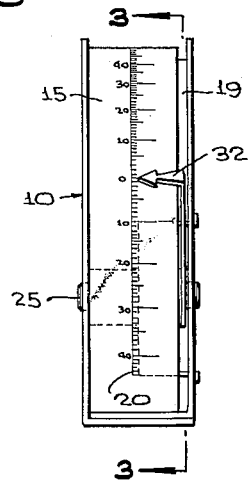
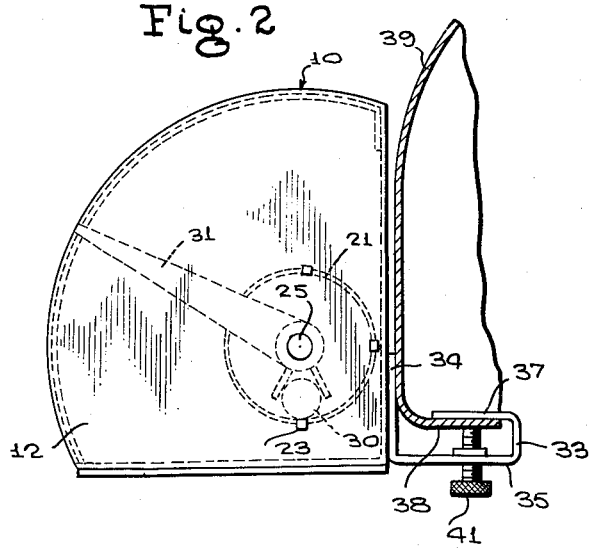
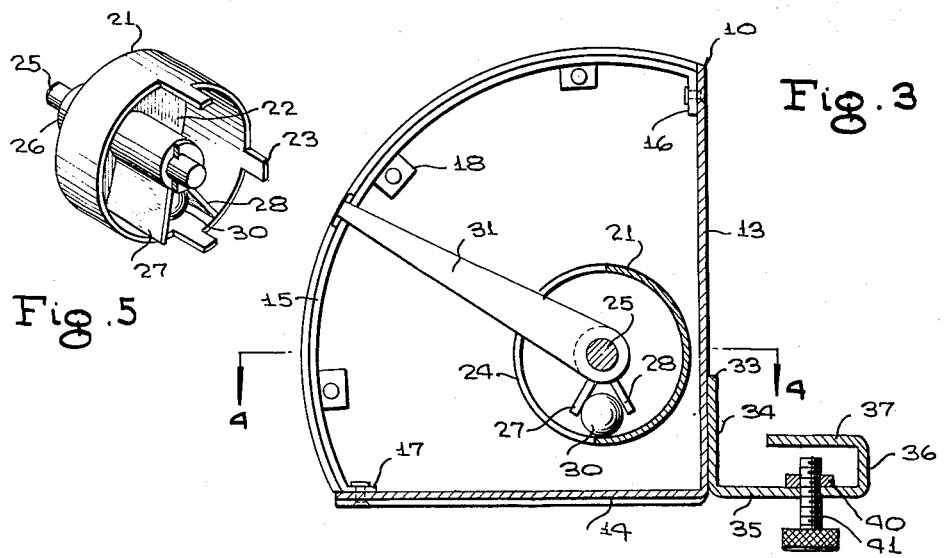
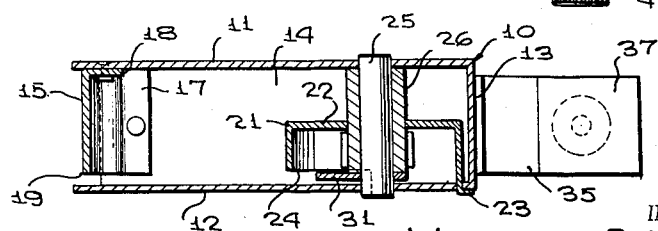
INVENTOR
WALDEMAR B. MUELLER
BY
McMorrow, Berman + Davidson
ATTORNEYS Patented Sept. 9, 1952

2,609,616

UNITED STATES PATENT OFFICE 2,609,616

GRADE INDICATOR FOR AUTOMOTIVE VEHICLES

Waldemar B. Mueller, Chicago, Ill.

Application January 4, 1952, Serial No. 264,867

3 Claims. (Cl. 33—206)

1

This invention relates to grade indicators for automotive vehicles and more particularly to a grade indicating instrument which can be detachably mounted on the vehicle in convenient view of the vehicle driver.

It is among the objects of the invention to provide an improved grade indicating instrument for an automotive vehicle which can be detachably mounted on a part of the vehicle, such as the vehicle instrument board, in convenient view of the vehicle driver and will continuously indicate the grade of the road over which the vehicle is traveling; which includes self damping features, so that the grade indication is not materially affected by vibration and movement of the vehicle; which is of small size and light weight and does not protrude into the driver's compartment of the vehicle sufficiently to cause inconvenience; and which is simple and durable in construction, economical to manufacture, easy to install, and neat and attractive in appearance.

Other objects and advantages will become apparent from a consideration of the following description and the appended claims in conjunction with the accompanying drawing wherein:

Figure 1 is a front elevational view of a grade indicating instrument illustrative of the invention;

Figure 2 is a side elevational view of the instrument shown in Figure 1, a portion of an associated vehicle instrument board being shown in cross section;

Figure 3 is a cross sectional view on the line 3—3 of Figure 1;

Figure 4 is a cross sectional view on the line 4—4 of Figure 3; and

Figure 5 is a perspective view of an assembly constituting an operative component of the instrument.

With continued reference to the drawing, the instrument comprises a hollow housing, generally indicated at 10, and including a pair of flat side walls 11 and 12 of substantially sector shape disposed in spaced apart and substantially parallel relationship to each other, a substantially straight back wall 13 extending along one pair of straight edges of the side walls 11 and 12 and joined along its longitudinal edges to the corresponding edges of the side walls, a substantially straight bottom wall 14 extending along the other pair of straight edges of the side walls and joined along its longitudinal edges to the latter, the back wall 13 and bottom wall 14 being disposed substantially perpendicular to each other, and an arcuately curved front wall 15 extending along

2 the curved edges of the side walls between the distal ends of the back and bottom walls of the housing. The front wall 15 is provided with apertured tabs, as indicated at 16 and 17, by means of which the front wall is secured at its ends to the back wall 13 and bottom wall 14 at the distal ends of the latter and is provided along one longitudinal edge with perpendicularly extending tabs 18 by means of which the front wall is secured along one longitudinal edge to one of the side walls, the front wall being shown secured to the side wall 11 in the drawing. The front wall has a width somewhat less than the distance between the curved edges of the side walls 11 and 12 providing a slot 19 extending longitudinally of the front wall between the side wall 12 and the adjacent edge of the front wall and a grade indicating scale 20 is provided on the outer surface of the front wall 15 and extends longitudinally of the slot 19.

In the arrangement shown, a degree scale is illustrated having a zero point substantially at the mid-length location of the front wall and extending in opposite directions from the zero point to indicate both upgrades and downgrades.

It is to be understood, however, that other scales may be substituted for the degree scale illustrated without in any way exceeding the scope of the invention. For example, it is contemplated that the scale may read in terms of the grade in feet per one hundred feet of grade length or in a percentage ratio of the rise to the run of the grade.

A cage 21 of cylindrical shape, having one open end and one end closed by an end wall 22 is disposed in the housing 10 adjacent the juncture between the back wall 13 and the bottom wall 14 of the housing. This cage has at its open end outwardly projecting tabs 23 which are received in apertures in the side wall 12 of the housing and are bent or clinched over to firmly secure the cage in position in the housing.

The cage is recessed at its open end to provide a circumferentially extending slot 24 between the edge of the cage at the open end of the latter and the inner surface of the side wall 12 of the housing.

A shaft or axle 25 extends through the cage 21 coaxially of the latter and of the curvature of the front wall 15 of the housing and is journaled at its ends in apertures provided in the side walls 11 and 12 of the housing 10. A sleeve 26 receives the shaft 25 between the side walls of the housing and extends through an aperture in the end wall 22 of the cage 21 and a pair of vanes 27 and 28 project radially from the sleeve 26 within the cage 21 and are angularly spaced apart.

When the bottom wall 14 of the housing is horizontally disposed with the back and side walls of the housing extending vertically upwardly therefrom, the vanes 27 and 28 span the lowest portion of the cylindrical wall of the cage 21 and a ball 30 of heavy material, such as heavy metal, is disposed between the vanes 27 and 28 and rides on the inner surface of the cylindrical wall of the cage 21. The vanes 27 and 28 are spaced to closely receive the ball between the end portions thereof remote from the sleeve 26.

A flat arm 31 is secured to the end of the sleeve 26 adjacent the side wall 12 of the housing and has an aperture therein receiving the shaft or axle 25. This arm extends through the slot 24 between the cage and the side wall 12 and through the slot 19 between the front wall 15 and the side wall 12 to the outer side of the front wall 15 and is there provided with a perpendicularly disposed pointer 32 which moves along the scale 20 to indicate the grade of the road over which a vehicle carrying the instrument is traveling.

A bracket 33 is mounted on the back wall 13 of the cage at the end of the back wall adjacent the bottom wall 14 and includes a leg 34 disposed against and extending along the back wall, a leg 35 extending perpendicularly from the end of the leg 34 adjacent the bottom wall 14 of the housing, a bight 36 extending perpendicularly upward from the end of the leg 35 remote from the housing, and a leg 37 extending from the end of the bight 36 remote from the leg 35 toward the leg 34 spaced from and substantially parallel to the leg 35.

The legs 35 and 37 and the bight 36 provide a U-shaped clamp for receiving the bottom flange 38 of a vehicle instrument board 39, as illustrated in Figure 2, and an apertured and internally screw threaded boss 40 is provided on the leg 35 with the screw threaded aperture extending through this leg. A thumbscrew 41 is threaded through the apertured boss 40 with one end opposed to the leg 37 of the bracket to clamp the instrument onto the bottom flange 38 of the instrument panel of a vehicle with the housing 10 of the instrument projecting rearwardly from the instrument panel and with the front wall 15 of the instrument in front of and in the direct view of the driver of the vehicle.

Friction between the ball 30 and the cylindrical wall of the cage 21 and the vanes 27 and 28 provides a sufficient damping action, so that, while the pointer 32 will move immediately to the proper position on the scale 20 to indicate the grade of the road on which the vehicle is currently disposed, motions of the vehicle and vibration will not cause the pointer to oscillate or be materially displaced from the proper location on the scale. The pointer will move along the scale to the proper grade indicating location as gravity maintains the ball 30 at the lowest portion of the cylindrical wall of the cage 21 and the grade inclination will be directly indicated at all times.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A grade indicating instrument for an automotive vehicle comprising a hollow housing having flat side walls disposed in spaced apart and substantially parallel relationship, a substantially straight back wall disposed between and joined along its longitudinal edges to corresponding edges of said side walls, a substantially straight bottom wall joined at one end to said back wall at one end of the latter and disposed between and joined along its longitudinal edges to corresponding edges of said side walls, said back wall and said bottom wall being disposed substantially perpendicular to each other, and an arcuately curved front wall extending between the distal ends of said back and bottom walls and disposed between corresponding edges of said side walls and joined to at least one of the latter, said front wall having a slot extending longitudinally thereof and a grade indicating scale on the outer side thereof extending along said slot, a cage of cylindrical shape disposed in said housing adjacent the juncture of said back and bottom walls, a shaft extending through said cage coaxially of the latter and of the curvature of said front wall and journaled at its ends in said side wall, said cage having a circumferentially extending slot therein, vanes projecting radially from said shaft in spaced apart relationship to each other in position such that they span the lowest portion of said cage, a ball of heavy material disposed between said vanes and riding on the inner surface of said cage, an arm secured at one end to said vanes and extending through the slots in said cage and said front wall, a pointer on the other end of said arm movable along said grade indicating scale, and a bracket secured to said housing and projecting therefrom for mounting the instrument on a vehicle part, such as a vehicle instrument board.

2. A grade indicating instrument comprising a substantially sector shaped housing having spaced apart and substantially parallel side walls, a front wall arcuately curved longitudinally thereof and provided with a longitudinally extending slot and a grade indicating scale extending along said slot, said housing having a substantially right angular corner opposite said front wall, a cage of cylindrical shape secured in said housing adjacent said right angular corner, a shaft extending through said cage coaxially of the latter and of the curvature of said front wall, vanes projecting from said shaft within said cage and spaced apart at their distal ends, a ball of heavy material disposed between said vanes and riding on the inner surface of said cage, said cage having a circumferentially extending slot therein, an arm secured at one end to said vanes coaxially of said shaft and extending through the slots in said cage and said front wall, a pointer on the other end of said arm movable along said scale upon movement of said ball relative to said cage, and a mounting bracket secured to said housing and projecting therefrom.

3. A grade indicating instrument comprising a substantially sector shaped housing having a front wall arcuately curved longitudinally thereof and provided with a grade indicating scale extending longitudinally thereof, said housing having a substantially right angular corner opposite said front wall, a cage of cylindrical shape mounted in said housing adjacent said right angular corner, a shaft extending through said cage coaxially of the latter and of the curvature of said front wall, angularly spaced apart vanes projecting radially from said shaft within said cage, a ball of heavy material disposed between said vanes and riding on the inner surface of said cage, an arm mounted on said shaft coaxially of the latter and movable with said vanes about the axis of said shaft, and a pointer on the other end of said arm movable along said scale.

WALDEMAR B. MUELLER.

REFERENCES CITED

The following references are of record in the file of this patent:

UNITED STATES PATENTS

| Number | Name | Date |
|---|---|---|
| 1,366,430 | Sperry | Jan. 25, 1921 |
| 2,020,238 | Cantaluppi | Nov. 5, 1935 |
| 2,350,103 | Fanger | May 30, 1944 |

FOREIGN PATENTS

| Number | Country | Date |
|---|---|---|
| 32,408 | France | Nov. 29, 1927 |